United States Patent
Hashida et al.

(10) Patent No.: US 11,505,058 B2
(45) Date of Patent: Nov. 22, 2022

(54) VEHICLE

(71) Applicants: TOYOTA JIDOSHA KABUSHIKI KAISHA, Toyota (JP); SUBARU CORPORATION, Tokyo (JP)

(72) Inventors: Shigenori Hashida, Nisshin (JP); Osamu Shimasaki, Nisshin (JP); Shinji Nakano, Tokyo-to (JP)

(73) Assignees: TOYOTA JIDOSHA KABUSHIKI KAISHA, Toyota (JP); SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/459,087

(22) Filed: Aug. 27, 2021

(65) Prior Publication Data
US 2022/0063395 A1    Mar. 3, 2022

(30) Foreign Application Priority Data
Aug. 31, 2020  (JP) .............................. JP2020-145716

(51) Int. Cl.
*B60K 11/04*    (2006.01)
*B62D 25/08*    (2006.01)

(52) U.S. Cl.
CPC ............ *B60K 11/04* (2013.01); *B62D 25/084* (2013.01)

(58) Field of Classification Search
CPC ........ B60K 11/04; B62D 25/084; B62D 21/11
See application file for complete search history.

(56) References Cited

U.S. PATENT DOCUMENTS

| | | | |
|---|---|---|---|
| 4,519,467 A * | 5/1985 | Saunders | F16F 1/3732 165/41 |
| 2018/0362086 A1* | 12/2018 | Bell | B62D 21/152 |
| 2020/0086926 A1 | 3/2020 | Hashida et al. | |

FOREIGN PATENT DOCUMENTS

| | | | | |
|---|---|---|---|---|
| CN | 104044445 A | * | 9/2014 | ............ B60K 11/04 |
| DE | 60025568 T2 | * | 10/2006 | ............ B60K 11/04 |
| DE | 102011106798 A1 | * | 1/2013 | ........... B62D 25/084 |
| EP | 1190883 A2 | * | 3/2002 | ............ B60K 11/04 |
| EP | 1757489 A2 | * | 2/2007 | ............ B60R 19/18 |
| JP | H0664453 A | * | 3/1994 | ........ F28F 2275/143 |
| JP | 2003011680 A | * | 1/2003 | |
| JP | 2005096684 A | * | 4/2005 | |
| JP | 2014-184928 A | | 10/2014 | |
| JP | 2020-044911 A | | 3/2020 | |

* cited by examiner

*Primary Examiner* — Hung Q Nguyen
(74) *Attorney, Agent, or Firm* — Dinsmore & Shohl LLP

(57) ABSTRACT

A vehicle may include: a body; a suspension member mounted at a front lower portion of the body, the suspension member comprising a front crossmember extending in a width direction of the vehicle; a first bracket projecting from the front crossmember toward a front portion of the vehicle, the first bracket comprising a first hole; a radiator comprising a first positioning member at a lower portion of the radiator, the first positioning member corresponding to the first hole and penetrating the first hole; and a second bracket secured to a lower surface of the first bracket, the second bracket comprising a second hole with which the first positioning member is engaged. A diameter of the first hole may be greater than a diameter of the first positioning member, and A secured position of the second bracket in a horizontal direction relative to the first bracket may be adjustable.

5 Claims, 5 Drawing Sheets

VEHICLE

CROSS-REFERENCE TO RELATED APPLICATION

This application claims priority to Japanese Patent Application No. 2020-145716 filed on Aug. 31, 2020, the contents of which are hereby incorporated by reference into the present application.

TECHNICAL FIELD

The technique disclosed herein relates to a vehicle. It particularly relates to a structure supporting a radiator using a suspension member supporting a suspension.

BACKGROUND

Japanese Patent Application Publication No. 2020-44911 describes a vehicle in which a radiator is mounted on a suspension member. The suspension member is a structure of the vehicle for supporting a suspension (especially a suspension arm), and attached to a body from below at a front portion of the vehicle.

SUMMARY

A secured position of a suspension member in a horizontal direction relative to a body may undesirably be displaced from a predetermined position. In this case, since a radiator is to be mounted on the suspension member, a secured position of the radiator in the horizontal direction relative to the body is also displaced.

A vehicle disclosed herein may comprise a body. The vehicle may comprise a suspension member mounted at a front lower portion of the body. The suspension member may comprise a front crossmember extending in a width direction of the vehicle. The vehicle may comprise a first bracket projecting from the front crossmember toward a front portion of the vehicle. The first bracket may comprise a first hole. The vehicle may comprise a radiator comprising a first positioning member at a lower portion of the radiator. The first positioning member may correspond to the first hole and penetrate the first hole. The vehicle may comprise a second bracket secured to a lower surface of the first bracket, and the second bracket may comprise a second hole with which the first positioning member is engaged. A diameter of the first hole may be greater than a diameter of the first positioning member. A secured position of the second bracket in a horizontal direction relative to the first bracket may be adjustable.

In the above vehicle, by virtue of the diameter of the first hole being greater than the diameter of the first positioning member, a position of the radiator in the horizontal direction relative to the suspension member can move to some extent within a margin. Accordingly, a secured position of the radiator in the horizontal direction can independently be determined without being affected by a secured position of the suspension member in the horizontal direction. Even when the secured position of the suspension member in the horizontal direction is displaced relative to the body, the secured position of the radiator in the horizontal direction relative to the body can correctly be determined. Further, by the second bracket, the radiator can be secured at the correct secured position. Accuracy in securing the radiator relative to the horizontal direction can be increased.

DETAILED DESCRIPTION

Figure 1:
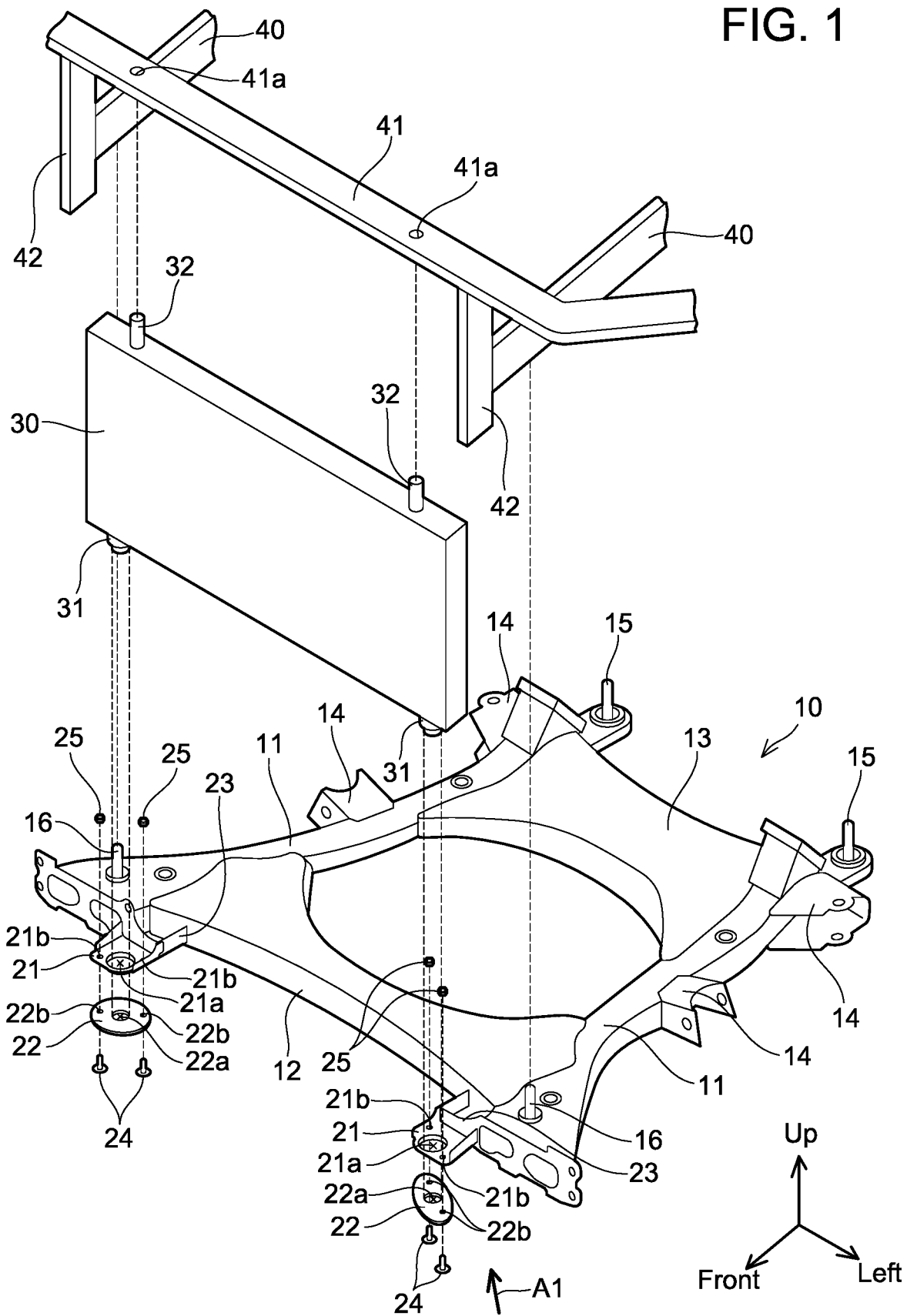
FIG. 1 illustrates an exploded perspective view of a structure of a front portion of a vehicle.

The first positioning member may comprise a bottom surface and a first protrusion, the bottom surface being in contact with an upper surface of the second bracket, and the first protrusion protruding downward from a part of the bottom surface. The first protrusion may be engaged with the second hole. By engagement between the first protrusion and the second hole, the position of the radiator in the horizontal direction can be fixed. In addition, the radiator can be supported from below by the upper surface of the second bracket.

The vehicle may further comprise a third bracket secured to the body. The radiator may comprise a second positioning member at an upper portion of the radiator. The second positioning member may be engaged with the third bracket. By engagement between the third bracket and the second positioning member, the position of the radiator in the horizontal direction relative to the body can be determined.

The third bracket may be a radiator upper support configured to support the upper portion of the radiator. The second positioning member may be a second protrusion. The second protrusion may be engaged with a hole defined in the radiator upper support. By engagement between the second protrusion and the hole defined in the radiator upper support, the position of the radiator in the horizontal direction relative to the body can be determined.

The first bracket may comprise a first bolt hole. The second bracket may comprise a second bolt hole. The vehicle may comprise a bolt penetrating the first bolt hole and the second bolt hole. A diameter of the second bolt hole may be greater than a diameter of the first bolt hole. By virtue of the diameter of the second bolt hole being greater than the diameter of the first bolt hole, the position of the second bracket in the horizontal direction relative to the first bracket is adjustable.

Representative, non-limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide improved vehicles, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Embodiments

<Structure of Front Portion of Vehicle>

Figure 2:
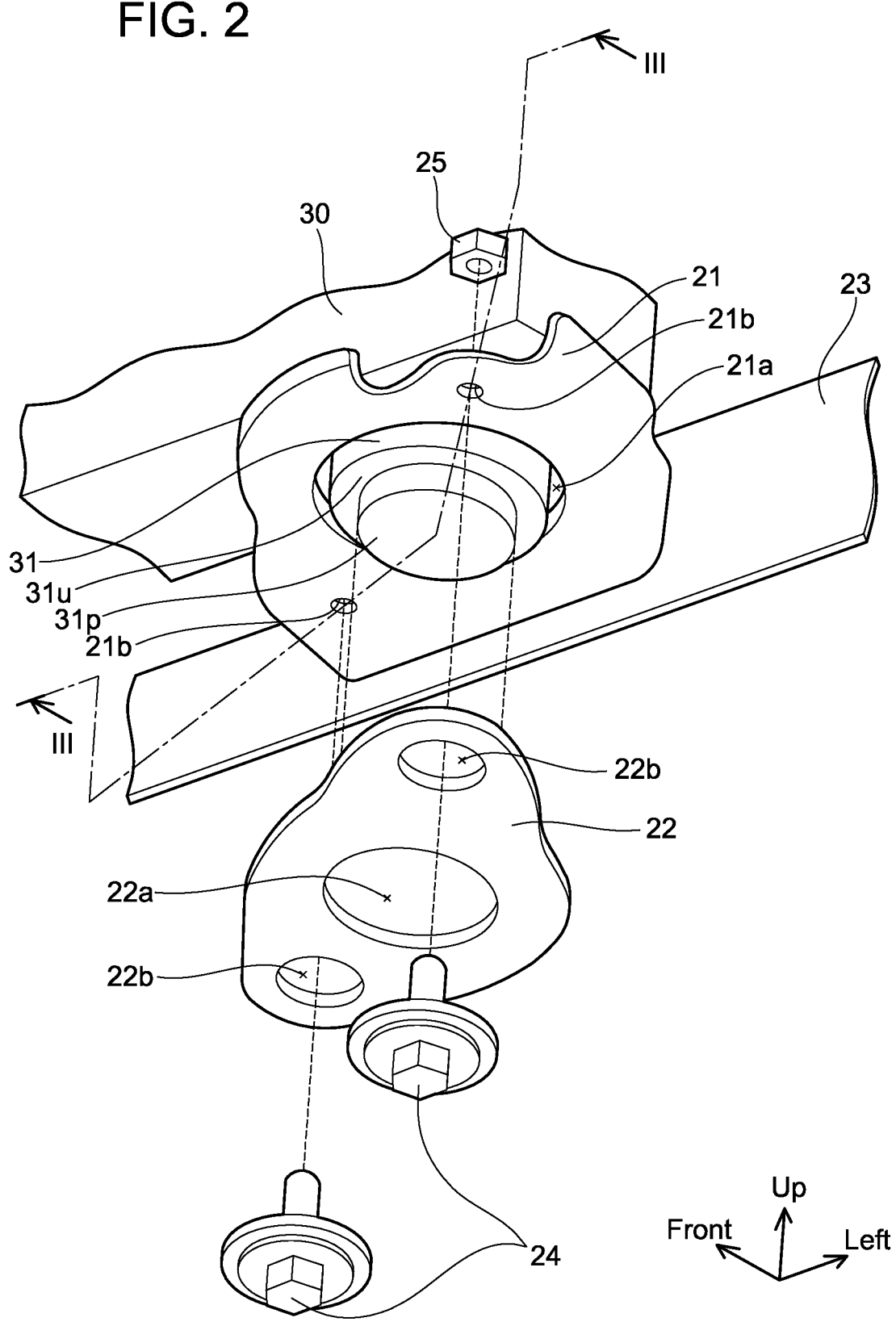
FIG. 2 illustrates an enlarged partial view of the exploded perspective view of the structure of the front portion of the vehicle.

FIG. 1 illustrates an exploded perspective view of a structure of a front portion of a vehicle of a present embodiment. FIG. 2 illustrates a partial enlarged view of the exploded perspective view viewed along a direction of an arrow A1 of FIG. 1. "Front" of a coordinate system of FIG. 1 indicates a forward direction of the vehicle. "Up" indicates an upward direction of the vehicle. "Left" indicates "left" when the front portion of the vehicle is viewed from a rear portion. The coordinate system means the same in all the drawings. Since a right side and a left side of the vehicle of the present embodiment are symmetrical, explanation below may be made only for one side of the vehicle.

The vehicle includes a suspension member 10, a radiator 30, front side members 40, a radiator upper support 41, and radiator side supports 42. Illustrations of other members are omitted in FIG. 1 and FIG. 2.

The front side members 40, the radiator upper support 41, and the radiator side supports 42 are members constituting a front body. The front side members 40 are members that constitute a frame of the front body. The pair of right and left front side members 40 is disposed on respective sides relative to a width direction of the vehicle, and extends in a front-rear direction of the vehicle. The pair of right and left radiator side supports 42 is pillar-shaped vertical members which support respective side portions of the radiator 30. The radiator side supports 42 are secured to respective front ends of the front side members 40 relative to the vehicle. The radiator upper support 41 is connected to upper ends of the radiator side supports 42. The radiator upper support 41 is a member supporting an upper portion of the radiator 30. The radiator upper support 41 extends in the width direction of the vehicle. Opposite ends of the radiator upper support 41 are connected to respective suspension towers (not illustrated) by, for example, connecting members such as braces. Holes 41a are defined in a bottom surface of the radiator upper support 41.

The suspension member 10 is a structure configured to mainly support suspension (a suspension arm in particular) in a vehicle which runs on a road, such as an automobile. The suspension member 10 includes a pair of side members 11, a front crossmember 12, a rear crossmember 13, arm brackets 14, fasteners 15 and 16, first brackets 21, second brackets 22, stays 23, bolts 24, and nuts 25. The side members 11 on the right and left sides are symmetrical, and extend in the front-rear direction of the vehicle. The front crossmember 12 extends between the pair of side members 11 in the width direction of the vehicle at the front portion of the vehicle. The rear crossmember 13 extends between the pair of side members 11 in the width direction of the vehicle at the rear portion of the vehicle. Each of the plurality of arm brackets 14 is a part to which a corresponding suspension arm (not illustrated) is to be connected.

The fasteners 15 are members securing a rear portion of the suspension member 10 to a dash crossmember (not illustrated) of the body. The dash crossmember is a member joined to a bottom surface of a dash panel which partitions an engine room and a cabin, and extends in the width direction of the vehicle. The fasteners 16 are members fastening a front portion of the suspension member 10 to the front side members 40. The suspension member 10 is secured by the fasteners 15 and 16 in a suspended state at a lower portion of the body.

The first brackets 21 are members connected to a lower end of the radiator 30 and supporting the radiator 30 from below. The two first brackets 21 are disposed symmetrically at the front portion of the suspension member 10. Each of the first brackets 21 is secured to the suspension member 10 via its corresponding stay 23, and projects toward the front portion of the vehicle from the front crossmember 12. Each of the first brackets 21 includes a first hole 21a and first bolt holes 21b.

The second brackets 22 are members separate from the first brackets 21, and have plate-like shapes. Each of the second brackets 22 includes a second hole 22a and second bolt holes 22b. Each of the bolts 24 penetrates its corresponding second bolt hole 22b and first bolt hole 21b, and engages with its corresponding nut 25. Due to this, each of the second brackets 22 is secured to a lower surface of its corresponding first bracket 21.

The radiator 30 is a low-profile and substantially cuboid component, and extends in the width direction and an up-down direction of the vehicle. The radiator 30 includes rubber bushes 31 and protrusions 32. The rubber bushes 31 are symmetrically disposed at a lower portion of the radiator 30. A position where each of the rubber bushes 31 is disposed corresponds to the first hole 21a of its corresponding first bracket 21. The rubber bushes 31 are also positioning members configured to determine a position of the radiator 30 in the horizontal direction relative to the suspension member 10.

The protrusions 32 are symmetrically disposed at the upper portion of the radiator 30. The protrusions 32 are constituted of an elastic member such as rubber. Each of the protrusions 32 engages with corresponding one of the holes 41a in the radiator upper support 41. The protrusions 32 are positioning members which determine the position of the radiator 30 in the horizontal direction relative to the body.

Figure 3:
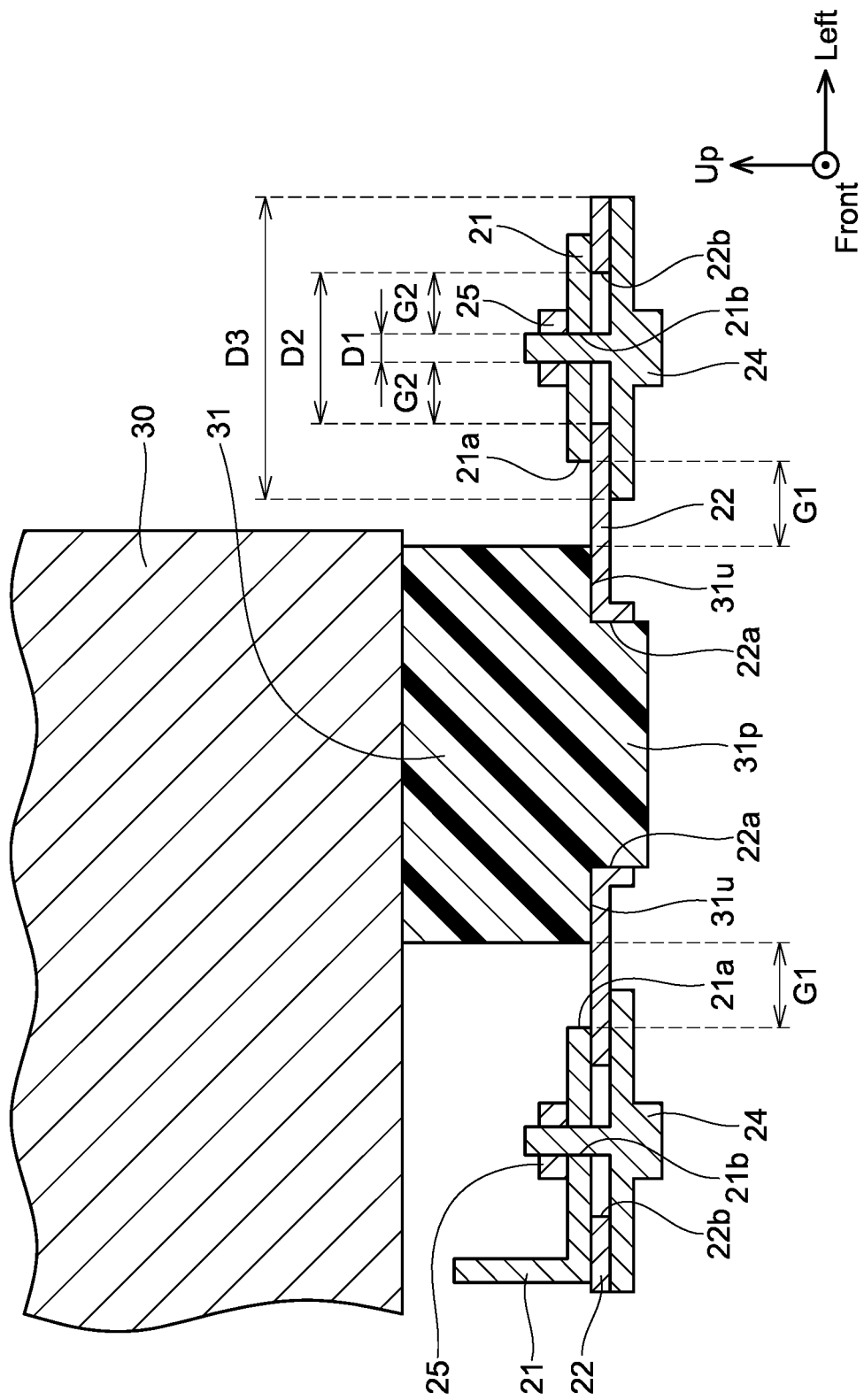
FIG. 3 illustrates a cross-sectional view along a line III-III of FIG. 2.

FIG. 3 illustrates a cross-sectional view along a III-III line of FIG. 2. The III-III line is a line passing through centers of the first hole 21a and the first bolt holes 21b. FIG. 3 illustrates a state in which the second bracket 22, the first bracket 21, the rubber bush 31, the bolts 24, and the nuts 25 are engaged with each other.

The second bracket 22 is secured to the lower surface of the first bracket 21 by the bolts 24 and the nuts 25. The bolts 24 are bolts with washers. A diameter D3 of each washer is greater than a diameter D2 of each second bolt hole 22b. The rubber bush 31 includes a bottom surface 31u and a protrusion 31p. The protrusion 31p is a portion protruding downward from a part of the bottom surface 31u. The rubber bush 31 penetrates the first hole 21a of the first bracket 21. The bottom surface 31u is in contact with an upper surface of the second bracket 22. The protrusion 31p is engaged with the second hole 22a of the second bracket 22.

A space G1 is provided between an outer circumference of the rubber bush 31 and an inner circumference of the first hole 21a. The diameter D2 of each of the second bolt holes 22b is greater than a diameter D1 of each of the first bolt holes 21b. A space G2 is provided between an outer circumference of each first bolt hole 21b having the diameter D1 and an inner circumference of its corresponding second bolt hole 22b having the diameter D2. The space G2 is greater than or equal to the space G1. Accordingly, a secured position of the second bracket 22 in the horizontal direction (right-left direction in FIG. 3) relative to the first bracket 21 is adjustable within an area of the space G1.

<Assembling Process of Radiator 30>

As a first step, the suspension member 10 and the radiator 30 are set on a lifter (not illustrated). At this point, positioning is performed such that the radiator upper support 41 is positioned vertically above the radiator 30 as illustrated in FIG. 1.

As a second step, the lifter is raised. The protrusions 32 disposed at the upper portion of the radiator 30 engage with the respective holes 41a in the radiator upper support 41. Due to this, the position of the radiator 30 in the horizontal direction relative to the body can be determined.

As a third step, the suspension member 10 is secured to the lower portion of the body by using the fasteners 15 and the fasteners 16. A positioning reference point of the suspension member 10 relative to the body is positioned on a rear side of the suspension member 10 with respect to the vehicle. For example, the fasteners 15 can be set as the positioning reference point. In this case, a position of the suspension member 10 in the horizontal direction relative to the body may be displaced in a fashion rotating about the positioning reference point. When this occurs, a degree of displacement of the position of the suspension member 10 in the horizontal direction increases toward the front portion of the vehicle, and reaches its maximum at the first bracket 21.

Figure 4:
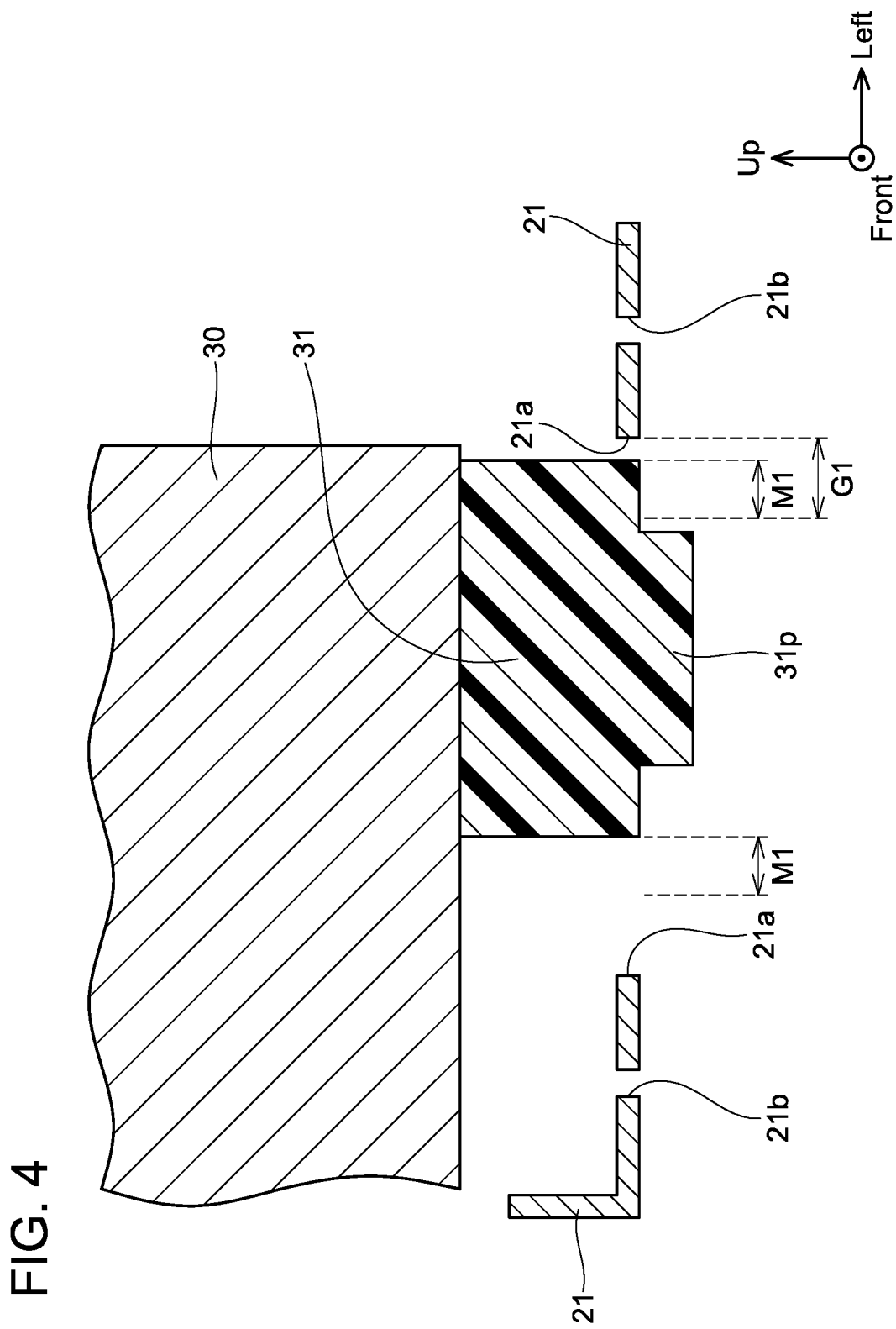
FIG. 4 illustrates a cross-sectional view explaining a process of assembling a radiator.

FIG. 4 illustrates an example case in which a position of each first bracket 21 in the horizontal direction relative to the body is displaced by a displaced amount M1 toward the right surface side of the vehicle (left side of FIG. 4). FIG. 4 is a cross-sectional view similar to FIG. 3. At the stage of FIG. 4, the second brackets 22 are not secured to the first brackets 21 yet. As aforementioned, the position of the radiator 30 in the horizontal direction relative to the body is defined as a correct position by the radiator upper support 41. Consequently, relative positions of the rubber bushes 31 and the first brackets 21 in the horizontal direction are displaced by the displaced amount M1. In the example of FIG. 4, the rubber bush 31 is displaced by the displaced amount M1 toward the left side of the vehicle (right side of FIG. 4) within the first hole 21a.

However, as described with reference to FIG. 3, the space G1 is provided between the outer circumference of the rubber bush 31 and the inner circumference of the first hole 21a. In other words, the rubber bush 31 can move in the horizontal direction within an area of the space G1 in the state of penetrating the first hole 21a. Consequently, the secured position of the radiator 30 in the horizontal direction can independently be determined without being affected by the secured position of the suspension member 10 in the horizontal direction. Accordingly, even when the position of the suspension member 10 in the horizontal direction relative to the body is displaced, the position of the radiator 30 in the horizontal direction relative to the body can correctly be determined.

Figure 5:
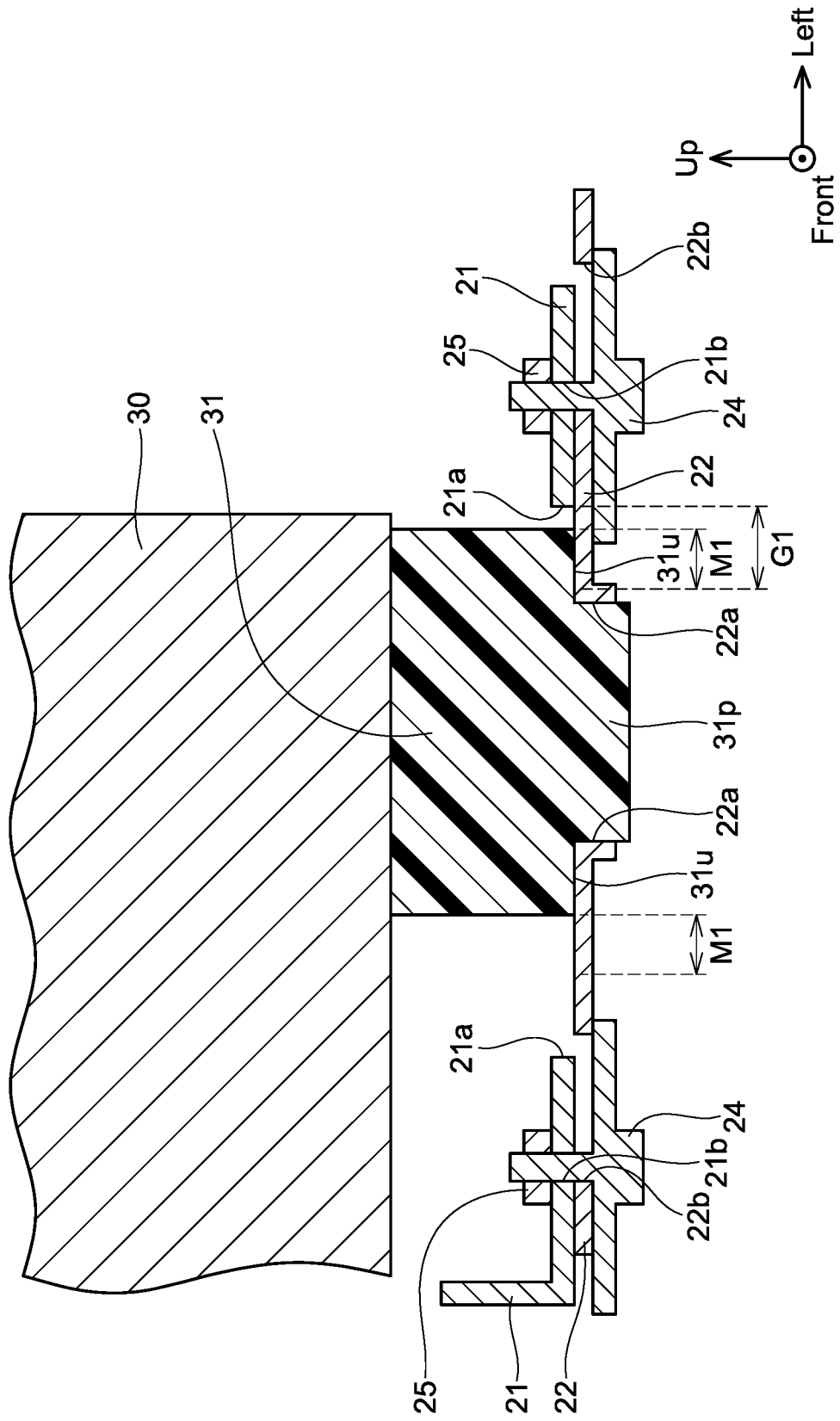
FIG. 5 illustrates a cross-sectional view explaining the process of assembling the radiator.

As a fourth step, the lifter is lowered. Subsequently, as illustrated in FIG. 5, the second brackets 22 are secured to the first brackets 21 from below. At this point, the second brackets 22 are each secured such that the second hole 22a in the second bracket 22 engages with its corresponding protrusion 31p. Consequently, the secured positions of the second brackets 22 can be determined in accordance with the position of the rubber bushes 31 that have moved.

As a fifth step, the second brackets 22 are secured to the first brackets 21 by the bolts 24 and the nuts 25. As aforementioned, since the space G2 is greater than or equal to the space G1, the secured positions of the second brackets 22 relative to the first brackets 21 can each be moved in the horizontal direction within the area of the space G1. Accordingly, as illustrated in FIG. 5, each rubber bush 31 can be secured to its corresponding first bracket 21 by using the second bracket 22 in the state where the rubber bush 31 has moved by the displaced amount M1. According to the above, the radiator 30 can be secured at the correct position in the horizontal direction relative to the body. Accuracy in securing the radiator 30 in the horizontal direction can be increased.

<Effect>

A radiator was conventionally secured to a body by using a dedicated supporting member (such as a radiator lower support) for supporting the radiator from a lower surface side thereof. According to the technique disclosed herein, the radiator 30 can be supported by the suspension member 10 from a lower surface side thereof. Since the dedicated support member need not be used, cost reduction and weight reduction of the vehicle are achieved.

The radiator was conventionally assembled by disposing the radiator on the dedicated support member and raising the dedicated support member by a lifter. According to the technique disclosed herein, the suspension member 10 and the radiator 30 can be concurrently assembled by disposing the radiator 30 on the suspension member 10 and raising the suspension member 10 by a lifter. The assembling process can be simplified.

Specific examples of the present disclosure have been described in detail, however, these are mere exemplary indications and thus do not limit the scope of the claims. The art described in the claims include modifications and variations of the specific examples presented above. Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

<Variant>

A bracket to determine the position of the radiator 30 in the horizontal direction relative to the body is not limited to the radiator upper support 41, but may be radiator side supports 42, for example. A positioning member relative to the horizontal direction is not limited to the protrusions 32, but may be grooves disposed on the radiator side supports 42, for example.

The suspension member 10 of the present embodiment includes the two first brackets 21, however, the number of the first brackets 21 is not particularly limited. The suspension member 10 may include single first bracket 21, or may include three or more first brackets 21.

Specific shapes and structures of the first brackets 21, the second brackets 22, the rubber bushes 31 and the suspension member 10 are not particularly limited. Shapes of the first holes 21a and the second holes 22a are not limited to be circular as in the present embodiment, but may be elliptic or groove-shaped.

The structure of the vehicle of the present embodiment may be employed not only for a vehicle having an engine as its prime mover but also for an electric vehicle having a motor configured to drive a wheel. The electric vehicle herein includes, for example, a rechargeable-type electric automobile charged by an external electric power source, a fuel-cell vehicle having a fuel cell as its power source, and a hybrid vehicle which also includes an engine.

The rubber bushes 31 are examples of first positioning member. The protrusions 31p are examples of first protrusion. The protrusions 32 are examples of second protrusion.

What is claimed is:

1. A vehicle comprising:
a body;
a suspension member mounted at a front lower portion of the body, the suspension member comprising a front crossmember extending in a width direction of the vehicle;
a first bracket projecting from the front crossmember toward a front portion of the vehicle, the first bracket comprising a first hole;
a radiator comprising a first positioning member at a lower portion of the radiator, the first positioning member corresponding to the first hole and penetrating the first hole; and
a second bracket secured to a lower surface of the first bracket, the second bracket comprising a second hole with which the first positioning member is engaged, wherein
a diameter of the first hole is greater than a diameter of the first positioning member, and
a secured position of the second bracket in a horizontal direction relative to the first bracket is adjustable.

2. The vehicle according to claim 1, wherein
the first positioning member comprises a bottom surface and a first protrusion,
the bottom surface is in contact with an upper surface of the second bracket,
the first protrusion protrudes downward from a part of the bottom surface, and
the first protrusion is engaged with the second hole.

3. The vehicle according to claim 1, further comprising:
a third bracket secured to the body, wherein
the radiator comprises a second positioning member at an upper portion of the radiator, and
the second positioning member is engaged with the third bracket.

4. The vehicle according to claim 3, wherein
the third bracket is a radiator upper support configured to support the upper portion of the radiator,
the second positioning member is a second protrusion, and
the second protrusion is engaged with a hole defined in the radiator upper support.

5. The vehicle according to claim 1, wherein
the first bracket comprises a first bolt hole,
the second bracket comprises a second bolt hole,
the vehicle comprises a bolt penetrating the first bolt hole and the second bolt hole, and
a diameter of the second bolt hole is greater than a diameter of the first bolt hole.

* * * * *